Figure 1:
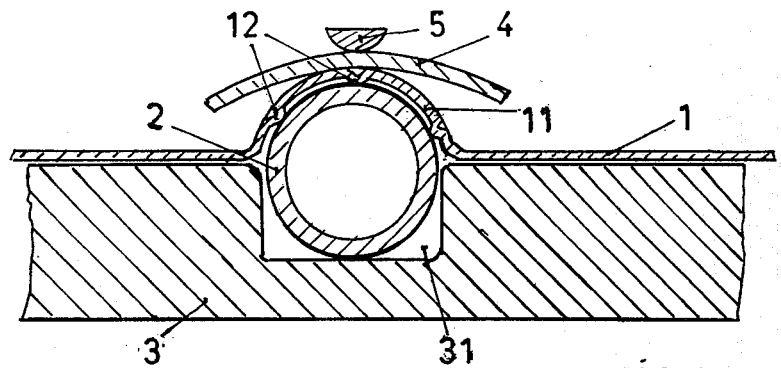

United States Patent [19]

Grossman et al.

[11] 4,347,965
[45] Sep. 7, 1982

[54] METHOD OF CONNECTING THIN METAL SHEETS TO METAL TUBES

[76] Inventors: Gershon Grossman, Hahorsha 18; Gideon Sivan, Tchernihovski 28a; Tudor Chefner, David Pinsky 37; Eliyahu Matania, Shoshanat Hacaremel 66a, all of Haifa, Israel

[21] Appl. No.: 132,300

[22] Filed: Mar. 20, 1980

[30] Foreign Application Priority Data

Mar. 28, 1979 [IL] Israel ............................. 56961

[51] Int. Cl.³ .................................. B23K 20/08
[52] U.S. Cl. .................... 228/107; 29/157.3 C
[58] Field of Search ........... 29/157.3 C; 228/107, 228/108, 109

[56] References Cited

U.S. PATENT DOCUMENTS

| | | | |
|---|---|---|---|
| 3,409,969 | 11/1968 | Simons et al. | 228/108 X |
| 3,724,062 | 4/1973 | Cantrell et al. | 228/109 |
| 3,987,952 | 10/1976 | Wittman et al. | 228/108 X |
| 4,074,406 | 2/1978 | Boyd et al. | 29/157.3 C |

FOREIGN PATENT DOCUMENTS 945452 1/1964 United Kingdom .
1168265 10/1969 United Kingdom .
1297708 11/1972 United Kingdom .
1561637 2/1980 United Kingdom ............... 228/107

*Primary Examiner*—Gil Weidenfeld
*Assistant Examiner*—Kenneth J. Ramsey
*Attorney, Agent, or Firm*—Schwartz, Jeffery, Schwaab, Mack, Blumenthal & Koch

[57] ABSTRACT

Connecting of a steel tube grid to a thin aluminum sheet to form a solar collector plate is carried out by explosive bonding to ensure a high thermal conductivity between sheet and tubes. Herein the sheet is prepressed in a pattern of channels of substantially semicircular cross section conforming to the shape of the tube grid. A heavy supporting plate is provided, in its flat surface, with a similar pattern of channels, but in mirror symmetry; the tubes of the grid are completely filled with water and the grid is laid into the channels of the supporting plate. Then the grid is covered by the sheet, with the channels covering the tubes and the flat sheet portions in contact with the surface of the supporting plate. Explosive charges in ribbon shape are laid onto the sheet along the apices of all channels on their outside, and the charges are detonated, whereafter the joined grid and sheet are removed from the plate.

6 Claims, 3 Drawing Figures

METHOD OF CONNECTING THIN METAL SHEETS TO METAL TUBES

The invention relates to a method of connecting thin metal sheets to metal pipes or tubes by using the force of an explosive charge, more especially to the connection of sheets and tubes of different metals. It relates particularly to the connection of steel tubes to thin aluminum sheets in solar collector plates with the object in view of providing a bond of high thermal conductivity between the plate components.

Since the inception of using solar radiation for domestic heat generation, it has been a major problem to utilize to a maximum the radiation impinging on the area of the solar collector and to transfer the thermal energy to a liquid flowing through the collector ducts. In its simplest and cheapest embodiment a solar collecting comprises a metal sheet of high conductivity and a steel tube coil or grid intimately connected thereto. Since soldering or welding of the two materials is not feasable, various methods are being used to obtain a heat-conductive connection by snugly fitting the tubes into grooves or channels pressed out of the sheet and joining their respective surfaces as well as possible by pressure exerted by means of clamps or the like. Up to now it has not been possible to obtain real intimate contact between tube and sheet, due both to the natural external roughness and to the impossibility to exert sufficient pressure by mechanical means. Since it could be shown that mechanical contact cannot provide satisfactory heat-transfer, it has been tried to fuse the metals to each other or to connect them by a third metal, as e.g. solder, poured into the interstices between the respective surfaces. As mentioned before, both alternatives are not possible or very difficult and expensive to obtain with plate components of different materials, and it is, therefore, the object of the present invention to fuse tubes and plates by using the force of an explosive charge.

Explosives have long been used for bonding a thin cladding material to a thicker base material, but only recently a method has been evolved for bonding two thin sheets by explosive seam welding. By this method one of the sheets to be joined along a given line is supported in the area opposite the explosive charge by a strong backing support, and the other sheet is placed on top of the first at a small distance between the surfaces to be bonded. A ribbon of an explosive material is placed on the upper sheet and detonated, thereby joining the sheets by impact. The same method is not applicable to bonding tubes and sheets, since no backing support can be provided to prevent distortion and caving-in of the tube.

To overcome this problem the following method has been devised in order to join a single tube or a grid or coil made by welding and/or bending of tubes, to a thin metal sheet. The method is, in the following, described in respect of a single, straight or curved, tube but it is advantageously applicable to an entire tube grid. According to the invention, the metal sheet is provided, by pressing or stamping, with a channeled section substantially corresponding to the contour of the tube, the channel being of a depth equal to, or less than the tube radius. The tube is now placed on a rigid support that comprises upstanding portions adjacent both sides of the tube, these portions extending in the shape of a planar surface to at least the height of the tube centre; thereafter the sheet is positioned on top of the tube with the channeled section covering the tube and with its flat, non-channeled area supported by the upstanding portions of the rigid support, the distance between the tube support and the planar surface being so dimensioned as to ensure a small gap between the tube and the inside of the channeled section. The tube is now filled with water or another non-compressible and non-inflammable liquid and the tube ends are tightly closed so as to prevent the liquid from escaping.

An explosive charge, preferably in the form of a cord or wick, is positioned on the apex on the outside of the channeled sheet section, either close to, or at a small distance from, the sheet material and is detonated; the force of the explosion drives the sheet onto the tube and fuses the metals of the two components, as known to the art. The tube is kept in its original shape due to the internal water pressure which prevents its caving-in or any other deformation. Due to the curvature of the channeled section the contact area between tube and sheet is of sufficient width to ensure full thermal energy flow from the sheet to the liquid flowing in the tube; dependent on the kind and shape of the explosive charge and its placement on the sheet, either one or two parallel bonding seams are created, a feature which is well known in the art of explosive bonding.

In a preferred embodiment of the invention a plurality of projecting knobs is provided on the inside of the channel surface, corresponding in height to the predetermined distance between sheet and tube, prior to their bonding.

The explosive is preferably in the form of a detonating fuse comprising an explosive core contained within a covering of plastic or another material; a preferred kind of explosive is pentaerythritol tetranitrate (PETN) either contained in a cord or in ribbon shape as commercially available.

In the accompanying drawing which illustrates, by way of example, two embodiments of the invention.

Figure 2:
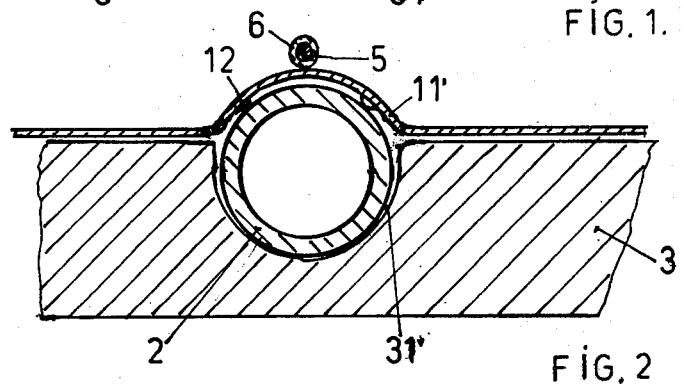
Figure 3:
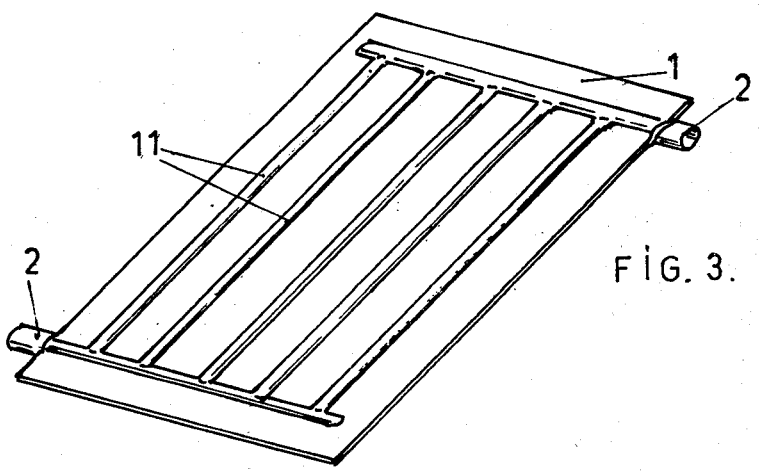

FIG. 1 is a section through a backing support, a tube and a sheet prior to their connection, FIG. 2 is a section through a modified arrangement of the backing support, tube and sheet, and FIG. 3 is a view of an assembled tube grid and sheet.

Referring now to FIG. 1 of the drawing a metal sheet 1 of e.g. aluminium, is connected to a tube 2 in the following manner. It will be understood that the tube 2 is a portion of an assembled coil or grid of a solar collector, such as depicted, as an example, in FIG. 3, but that in the following description reference is being made to one tube only. The tube is positioned on a solid backing support 3 which is provided with a groove 31 of a width slightly larger than the tube diameter and of a depth equal to the height by that the tube is intended to protrude out of the sheet after their connection by bonding. The sheet 1 is provided with an inverted channel 11 of slightly larger inner diameter than the outer tube diameter and is furthermore provided with a plurality of inwardly projecting knobs 12, both channel and knobs being preferably made by means of a pressing operation, leaving the rest of the sheet in flat state. The flat portion of the sheet is positioned on the upper surface of the backing support and the channeled section on the tube, the knobs 12 keeping the sheet and the tube apart by a distance determined by the height of these knobs.

Thereafter a strip 4 of a plastic material, as e.g. polyethylene, is positioned on the apex of the channeled section centrally therewith, and a ribbon-shaped explosive charge 5 is placed centrally on this strip (4). Referring to the previous statement that the tube 2 constitutes a component of a coil or a grid, it will be understood that the backing support will have the full dimensions of the plate illustrated in FIG. 3, viz. it may be a heavy steel plate, and that grooves 31 are cut into this supporting plate in the identical shape of the grid. The sheet, which covers the entire grid, is similarly pressed out in the shape of corresponding channel sections, as visible in FIG. 3.

Therefore, in order to connect a grid to a sheet, explosive ribbons are being laid along all apices of the channeled sections and detonated simultaneously.

The great advantage of the present method is primarily the low manufacturing cost for a large series of collector plates, making allowance for the write-off of the pressing tools and the backing support.

The method permits the use of thin heat-conductive sheets of aluminium and of steel tubes, and their complete bonding by relatively wide seams, resulting in perfect heat transfer conditions. It further permits complete pre-fabrication of grids and sheets and their assembly in one operation, in contradistinction to many previous methods whereby the headers of the grids cannot be connected to the sheet. The same method can, obviously, be applied to tube coils of zigzag- or similar configuration, whereby the bends at the ends of the tubes are bonded to the sheet in one operation with the lengths of straight tubes of the coil.

FIG. 2 illustrates a modification of the assembly before detonation of the explosive charge. Herein the channel 11' of the sheet 1 is less deep, supporting only about one third of the tube circumference. Accordingly the groove 31' is deeper than that of FIG. 1 and, in addition, is made concave so as to hug the lower half of the tube and to prevent any lateral movement. The explosive charge 5' is, in the present case, laid close to the channel apex, without the use of an intervening strip of plastic (4 in FIG. 1): the explosive material is enclosed in a tube 6 of plastic material, similar to a detonating fuse, whereby the same effect is obtained as with a plastic strip.

The method may be varied with regard to the shape of the channels in the sheet as well as to the grooves in the backing support. Instead of using a solid steel plate provided with machined grooves, it is proposed to assemble a backing support from a much thinner plate serving as tube support, and two upstanding lateral portions in the shape of strips of material fixed to this plate on both sides of the tube, which are flat on top and serve to support the flat sheet portions on the sides of the channel sections.

It is also suggested that other modifications and alterations may be carried out to the method by a person skilled in the art, without deviating from the spirit of the invention and the scope of the appended claims.

What we claim is:

1. A method of connecting a metal sheet to a metal tube, both being preferably components of a solar collector plate, by forming a stripshaped bond between a portion of said sheet and a portion of the circumference of said tube, the method comprising the following steps in combination,
    providing said metal sheet with a channeled section, substantially corresponding in size and shape to the contour of said tube, said channel being adapted to contain said tube and being preferably of a depth not more than one half of the tube diameter, while the portions of said sheet adjoining said channeled section are substantially flat and planar,
    positioning said tube onto a rigid support which comprises upstanding portions adjacent both sides of said tube extending in the shape of a planar surface to a level above the bottom surface of said tube substantially equal to the distance said tube is predetermined to project beyond said flat and planar portions of said sheet,
    filling said tube with water or another non-compressible and non-inflammable liquid and closing the previously open ends of said tube,
    positioning said sheet onto said tube and said rigid support, whereby said channel section covers said tube and whereby said planar portions rest on said upstanding portions of said rigid support,
    placing an explosive charge in the shape of a bond or ribbon onto the apex of the outside of said channeled section and detonating the charge.

2. A method as defined in claim 1, comprising the positioning of a strip of plastic material between said explosive charge and said channeled section of said sheet.

3. In a method as defined in claim 1, a rigid support consisting of a thick plate provided with a groove of a width slightly larger than the diameter of said tube and of a depth corresponding to the height to which said tube is predetermined to protrude beyond the planar portions of said sheet.

4. In a method as defined in claim 1, a rigid support consisting of a plate serving as support for said tube, and upstanding portions connected to said plate along both sides of said tube, serving as supports for planar portions of said sheet.

5. A method of bonding a tube grid to a thin heat-conducting sheet as defined in claim 1, comprising the making of channeled sections in said sheet corresponding in shape and size to said tube grid.

6. A method of bonding a tube grid to a heat-conducting sheet as defined in claim 5, comprising the positioning of ribbons of an explosive charge on all channeled sections of said sheet.

* * * * *